Figure 1:
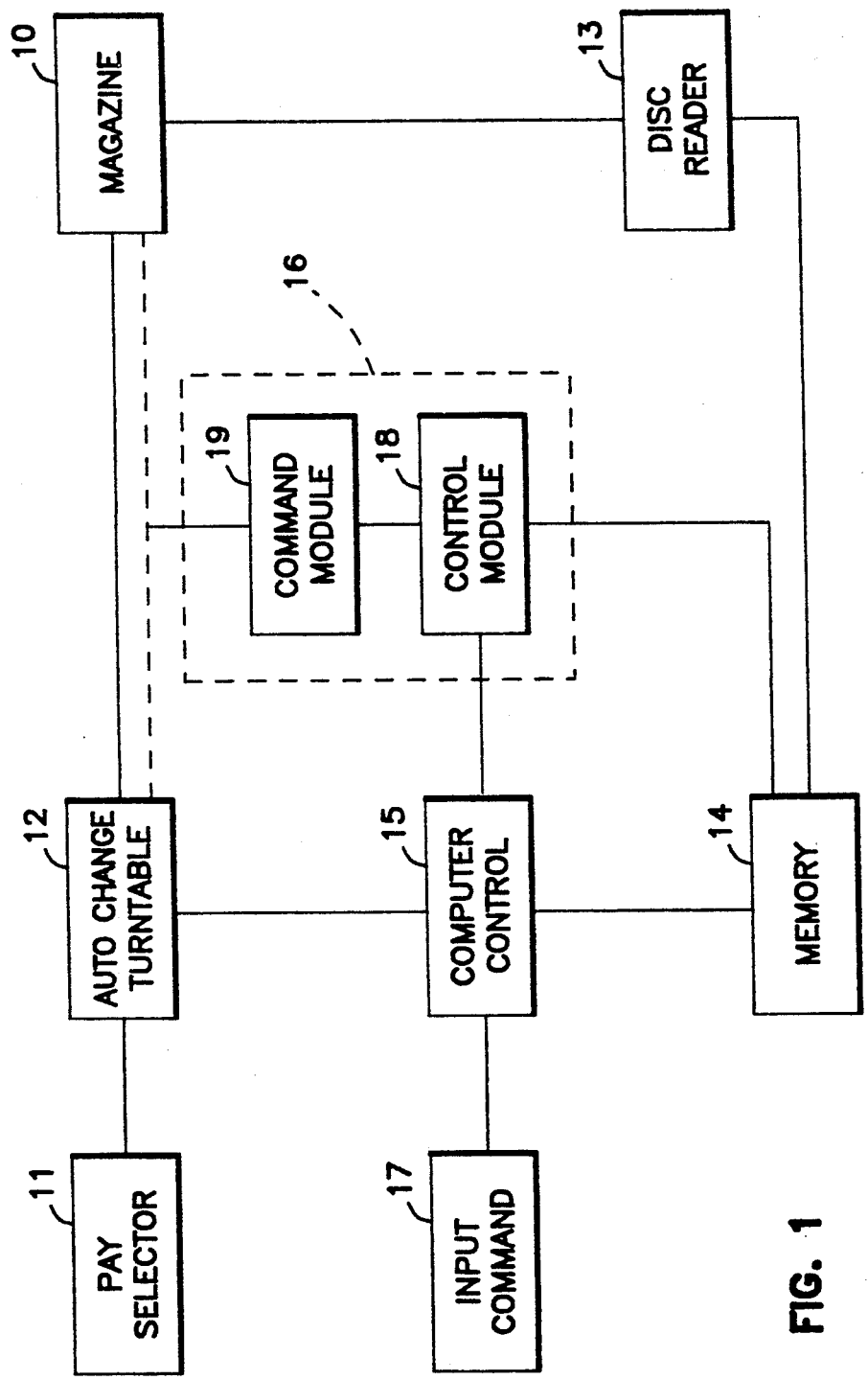

United States Patent [19]

Blakeway et al.

[11] Patent Number: 5,185,727
[45] Date of Patent: Feb. 9, 1993

[54] COIN OR TOKEN OPERATED MACHINE FOR PLAYING PRE-RECORDED RECORD DISCS

[76] Inventors: Ian Blakeway, Ridge House, Wall Nook Lane, Huddersfield HD8 8YB; Frank Holmes, 17 Bank End Road, Barnsley, both of Great Britain

[21] Appl. No.: 613,895
[22] PCT Filed: May 10, 1989
[86] PCT No.: PCT/GB89/00495
§ 371 Date: Dec. 6, 1990
§ 102(e) Date: Dec. 6, 1990
[87] PCT Pub. No.: WO89/11135
PCT Pub. Date: Nov. 16, 1989

[30] Foreign Application Priority Data

May 10, 1988 [GB] United Kingdom ............. 8811070

[51] Int. Cl.$^5$ .................... G11B 17/22; G11B 17/08
[52] U.S. Cl. .................... 369/34; 369/36; 360/98.11; 360/98.04; 360/98.05
[58] Field of Search .................... 369/34, 36, 38, 39, 369/178; 360/98.01, 98.011, 98.05, 98.06

[56] References Cited

U.S. PATENT DOCUMENTS

| | | | |
|---|---|---|---|
| 3,662,344 | 5/1972 | Menke | 369/34 |
| 4,538,253 | 8/1985 | Ishibashi et al. | 369/36 |
| 4,647,989 | 3/1987 | Geddes | 369/34 X |
| 4,667,802 | 5/1987 | Verduin et al. | 369/34 X |
| 4,766,581 | 8/1988 | Korn et al. | 369/34 X |
| 4,872,151 | 10/1989 | Smith | 235/462 |

Primary Examiner—John W. Shepperd
Assistant Examiner—Tan Nguyen
Attorney, Agent, or Firm—Merchant, Gould, Smith, Edell, Welter & Schmidt

[57] ABSTRACT

There is disclosed a coin or token operated machine for playing pre-recorded discs and which comprises a magazine store (10) for holding a plurality of pre-recorded record discs, with each disc having its own distinctive coding extracted, a selector (11) operative to initiate extraction of a selected disc from the magazine (10), and an extractor mechanism (23) operative to extract a selected disc from the magazine (10) and to place it on a turntable or other playing device. A record disc reader (13) extracts a code from each selected disc, and this information is input to a memory (14) which stores data concerning the discs which are selected for playing. A computer controlled system (15) controls the overall operation of the machine, and a disc replacement device (16) initiates indication of the least popular disc at each inspection of the machine, for the period back to the previous inspection.

2 Claims, 1 Drawing Sheet

COIN OR TOKEN OPERATED MACHINE FOR PLAYING PRE-RECORDED RECORD DISCS

This invention relates to a coin or token operated machine for playing pre-recorded record discs.

A machine of this type is usually referred to as a "juke box", in which, as is well known, the customer makes a selection of one or more discs to be played, from a list of titles, and on payment of an appropriate amount by coin or token to operate the machine, the juke box automatically extracts a selected disc from a magazine store and places it on a turntable to be played. At the end of play, the record disc is returned to the magazine, ready for a next selection to be made. The record discs used in juke boxes can be either digital or analogue discs.

Typically, a juke box may employ a system for recording the number of plays or selections made on each disc, and therefore has some means for transferring this information to the owner or his representative, who can then use this information to remove the discs which are less popular, and to make a note of the type of music which is found to be most popular, and therefore to introduce more record discs of that more popular type at some convenient time e.g. upon a routine inspection or servicing of the juke box.

Due to the large number of discs which are used, this recordal process is often automated, and the data relating to the number of selections or plays of each disc is transferred via a solid state memory, hard copy print or other means to a computer, which is usually situated at a central control point and which is capable of receiving information from a number of juke boxes under its control. Thus, at the central point, the data can be analysed with more or less human interference, as is thought desirable by the owner. This computer control at the central point is therefore a remote computer. The data collected is used to decide both the discs which should be removed owing to their indicated unpopularity, as well as which discs should replace the removed discs as being likely to be more popular. This is effectively programming of the juke box.

Usually, each juke box is inspected and information collected every two weeks. The data is usually collected from the juke box by persons who have no particular skills, and who are not in the best position to decide which discs should be removed from the juke box, and which discs should replace them. Furthermore, the data is not usually available in a form which is readily readable by the person collecting the data, until the information is processed by the remote computer.

With these existing techniques, the identity, and location within the disc or magazine store, of the discs to be removed having been identified by the remote computer, can be removed at the next inspection of the juke box. Usually, the method of identifying each disc is by its location within the disc store or magazine. Thus, the number of plays or selections relates to magazine position of each disc, and it is therefore necessary to have the title of each disc and its magazine position stored in the remote computer.

The present invention therefore seeks to provide an improved coin or token operated machine for playing pre-recorded discs in which the advantages of remote programming may be retained, but delays introduced by the intervals between subsequent inspections of the machine can be made to have less effect.

According to the invention there is provided a coin or token operated machine for playing pre-recorded record discs and which comprises:

- a magazine store for holding a plurality of pre-recorded record discs, with each disc having its own distinctive coding extracted;
- a selector operable to initiate extraction of a selected disc from the store;
- a mechanism operative to extract a selected disc from the store and to place it on a turntable or other playing device;
- a record disc reader operable to extract a code of each selected disc;
- a memory connected to the reader and operative to store data concerning the discs which are selected for playing;
- a computer control system arranged to control the operation of the machine; and,
- a disc replacement device connected to the control system and to the memory, and operative upon each periodic inspection of the machine to initiate indication of the least popular record disc since the previous inspection.

Thus, upon each routine inspection e.g. monitoring/servicing of the machine, typically at fortnightly intervals, the machine can be interrogated so as automatically to indicate the least popular record disc i.e. the least used or nil used record since the previous interrogation. The person carrying out the servicing etc. can therefore extract this least popular disc and replace it with another disc which is considered likely to be more popular. This replacement disc may be determined from general data derived from the operation of other juke boxes under central control, or from other data.

The indication of the least popular disc may take place in any convenient form. Thus, in one preferred arrangement, the disc replacement indicator device comprises a control module operative to receive data from the memory concerning the least popular disc, and a command module connected to the extractor mechanism and operative to cause the latter to extract the least popular disc from the magazine and to place it on the turntable. This therefore enables the operator, carrying out the routine inspection of the machine, to extract this disc, and then replace it with an anticipated more popular disc.

In a further embodiment, the command module is connected to the magazine and is operative to cause the latter to indicate the least popular disc held in the magazine. This may be carried out by arranging for the magazine to be movable relative to a pre-set datum mark so as to bring the least popular disc in line with this mark.

Preferably, an input command is connected to the computer control system to enable the machine to be interrogated at each inspection, and which may include a manually operated signalling device e.g. a control button, to provide a signal that the least popular disc has been removed, and replaced by an anticipated more popular disc, the coded information of which will be read and updated into the memory.

One embodiment of coin or token operated playing machine according to the invention for playing pre-recorded record discs will now be described in detail with reference to the accompanying drawing which is a schematic block diagram.

Referring now to the drawing, the embodiment of the invention comprises a coin or token operated machine for playing pre-recorded record discs, and which has a magazine store 10 for holding a plurality of pre-recorded record discs, with each disc having its own distinctive coding extracted. The discs may be digital or analogue record discs, or compact discs. A selector 11 is operable to initiate extraction of a selected disc from the magazine store 10 by operation of an extractor mechanism forming part of an auto change turntable 12 which extracts a selected disc from the magazine store 10 and places it on a turntable, so that playing of the disc can take place. A record disc reader 13 is connected to the magazine 10 and is operable to read extract a code of each selected disc. The disc reader 13 may be a separate auto change turntable unit 12. A memory 14 is connected to the disc reader 13 and is operative to store data concerning the discs which are selected for playing.

A computer control system 15 provides overall control of the operation of the machine.

A disc replacement device or circuit, shown by dashed outline 16, is connected to the computer control 15 and also to the memory 14, and is operative upon each inspection of the machine to initiate indication of the least popular disc since the previous inspection. An input command 17 is provided to the computer control 15 to initiate interrogation of the memory by the device 16, to initiate an indication of the least popular record disc. Routine inspection e.g. for monitoring or servicing of the machine may take place typically at fortnightly intervals, and the person carrying out the inspection can extract the indicated least popular disc and replace it with another disc which is considered likely to be more popular. Although device 16 is shown as a separate component, it will usually be built into the computer control system 15.

The indication of the least popular disc may take place in a number of forms. In one arrangement, the disc replacement device 16 comprises a control module 18 which is operative to receive data from the memory 14 concerning the least popular disc, and a command module 19 which can be connected to the extractor mechanism 12 to cause the latter to extract the least popular disc from the magazine 10 and place it on the turntable. The connection of the command module 19 to extractor mechanism and auto change turntable 12 is shown by dashed line.

In an alternative embodiment, the command module 19 is connected to the magazine 10, as shown by dashed lines, and is operative to cause the latter to indicate the least popular disc held in the magazine. This may be carried out (by means not shown) by arranging for the magazine to be movable relative to a pre-set datum mark so as to bring the least popular disc in line with this mark.

The input command 17 enables the machine to be interrogated at each inspection, and also includes a manually operated signalling device in the form of a push button control, which can provide a signal to a remote computer that the least popular disc has been removed, and replaced by an anticipated more popular disc, the coded information of which can be read and updated into the memory 14.

Thus, during each inspection of the machine, an identity can be extracted from each disc, based on the position of a number of pieces of music on that disc, or on the digital information which relates to the music on the disc. This identity can be in the form of a 12 digit number, and can be considered unique for practical purposes. The computing to record how many plays are made on each discs is completed by the computer provided on the juke box. It is therefore not necessary to record the position of each disc in the magazine, as the number of plays or selections relates directly to the disc. This information is stored within the juke box and updated at each selection of a disc by a customer. When this data is collected at the normal interval, the juke box automatically offers to the person collecting the information the least played disc during the interval between visits. As indicated above for one embodiment, this information may be offered by automatically bringing from the disc store or magazine onto the turntable or other playing device the disc concerned, without actually playing the disc. The bringing out of the disc store of this disc is just one method of offering the disc for replacement. In the other embodiment referred to above, this information is made available by lining-up the disc within its magazine with a pre-set mark for disc replacement.

When a least popular disc is offered for replacement, by positioning on the turntable, or by other means, the disc can be replaced by another disc already identified from information collected during the previous visit as being desirable for that particular joke box. The pressing of the button or other signalling device signals at input command 17 indicates that the disc has been changed and replaced, and the coded information about the replacement disc is collected via the computer control and updated into the memory 14, this information including the identity number of the disc.

When used with cathode ray tube display or other electronic display the selection program as seen by the customer can be automatically updated from this information. Should the disc be faulty or placed upsidedown this can also be detected at this point and the disc not accepted by the juke box. If it is required to keep the disc on the juke box for some reason the button is pressed and the disc identified as the same disc by the computer this can be stored in memory and the reason for not changing established later if desired. When this first disc is changed (or not) then the juke box offers the next least popular disc in the same manner. This process is repeated until such time as all the new discs desired to be fitted on that particular visit are fitted. Discs which have been identified by the juke box as faulty are changed before the least popular discs and this fact stored in memory. This data is now transferred from the memory of the juke box to the storage or transmitting device used. This data contains all the information relative to the number of selections on each disc (along with information such as cash taken by juke box and identity number of juke box). The information about both the discs that have been changed and their replacements are also transferred along with any changes due to faulty discs. This information can be analysed at a central point by the remote computer or other means and the required discs for the next visit decided upon. Further to this the discs identified as being required to be fitted at the last visit can be identified as having been fitted or not. As the discs removed would also normally be returned with the data it can also be established that the actual discs returned are the discs from that juke box.

We claim:

1. A coin or token operated machine for playing pre-recorded record discs and which comprises:

a magazine store for holding a plurality of prerecorded record discs, with each disc having its own distinctive coding extracted;

a selector operable to initiate extraction of a selected disc from the store;

an extractor mechanism operable to place a selected disc in a designated position;

a record disc reader operative to extract a code of each selected disc;

a memory connected to the reader and operative to store data concerning the discs which are selected for playing;

a computer control system arranged to control the operation of the machine; and a disc replacement device connected to the control system and to the memory, and operative upon each inspection of the machine to indicate a least popular record disc since the previous inspection, said disc replacement device further comprising a control module operative to receive data from the memory concerning the least popular disc, and a command module connected to the extractor mechanism and operative to cause the extractor mechanism to extract the least popular disc from the magazine store and place it in a playing device for removal from the machine.

2. A machine according to claim 1, in which an input command is connected to the computer control system to enable the machine to be interrogated at each inspection, and which includes a manually operable signalling device to provide a signal that the least popular disc has been removed and replaced by an anticipated more popular disc, with the coded information thereof being read and updated into the memory.

* * * * *